United States Patent [19]
Rodell et al.

[11] Patent Number: 5,730,172
[45] Date of Patent: Mar. 24, 1998

[54] INLET VALVE FOR AN AIR DRIER

[75] Inventors: Gerald Rodell, Oak Grove, Mo.; Sven-Olof Larsson, Landskrona, Sweden; Curtis S. Snyder, Independence, Mo.

[73] Assignee: Haldex AB, Landskrona, Sweden

[21] Appl. No.: 643,545

[22] Filed: May 6, 1996

[30] Foreign Application Priority Data

May 15, 1995 [SE] Sweden .................. 9501781

[51] Int. Cl.$^6$ ............................ B01D 19/00
[52] U.S. Cl. ............................ 137/102; 137/509
[58] Field of Search ................. 137/102, 509

[56] References Cited

U.S. PATENT DOCUMENTS

| | | | |
|---|---|---|---|
| 2,989,971 | 6/1961 | Valentine | 137/509 |
| 3,437,042 | 4/1969 | Kemp | 137/509 |
| 3,608,581 | 9/1971 | Sweet | 137/509 |
| 3,799,185 | 3/1974 | Milnes et al. | 137/102 |
| 3,827,451 | 8/1974 | Roob | 137/102 |
| 4,557,180 | 12/1985 | Glomeau | 137/102 |
| 5,144,976 | 9/1992 | Crumb | 137/509 |
| 5,252,034 | 10/1993 | Sweet . | |
| 5,271,428 | 12/1993 | Dunn et al. | 137/509 |

*Primary Examiner*—Marguerite McMahon
*Attorney, Agent, or Firm*—James Ray & Associates

[57] ABSTRACT

An inlet valve for an air drier between an inlet (35) from a compressor and an inlet bore (32) comprises an axially movable valve element (31), a spring (34) for biasing the valve element into a closing position against a seat (30'), and a valve element shoulder (31'), on which the pressure in the inlet is arranged to act in a valve opening direction. A sealing on the shoulder is in the form of a U-sealing (36) allowing air under pressure admitted to the underside of the valve element for urging the latter in a valve closing direction to pass by the sealing to the inlet but preventing flow in the opposite direction.

2 Claims, 2 Drawing Sheets

5,730,172

INLET VALVE FOR AN AIR DRIER

TECHNICAL FIELD

The present invention relates to an inlet valve for an air drier, preferably for a vehicle compressed air system, between an inlet from a compressor and an inlet bore, comprising an axially movable valve element, a spring for biasing the valve element into a closing position against a seat, and a valve element shoulder, on which the pressure in the inlet is arranged to act in a valve opening direction.

BACKGROUND OF THE INVENTION

An inlet valve of the above type, also called a turbo protection valve, is to be used in a certain compressed air system for preventing air from the compressor from entering the air drier, unless it has reached a certain pressure.

In certain instances it is desired to "isolate" the air drier from the system, i e to close the inlet to the air drier and at the same time to allow separately admitted air under pressure to flow backwards from the system to the compressor (by-passing the air drier).

THE INVENTION

The above valve, which is supplied as a separate unit, may be built-into the air drier and according to the invention be modified for performing the above function in such a way that a sealing on the valve shoulder is in the form of a U-sealing allowing air under pressure admitted to the underside of the valve element for urging the latter in a valve closing direction to pass the sealing to the inlet but preventing flow in the opposite direction.

THE DRAWINGS

The invention will be described in further detail below under reference to the accompanying drawings, in which FIG. 1 is an overview of a certain compressed air system, FIG. 2 is a section through a prior art valve in the system of FIG. 1, FIGS. 3 and 4 are diagrammatic illustrations of valve functions, FIG. 5 is a section through a prior valve, and FIG. 6 is a section of a valve according to the invention.

DETAILED DESCRIPTION OF A PREFERRED EMBODIMENT

Figure 1:
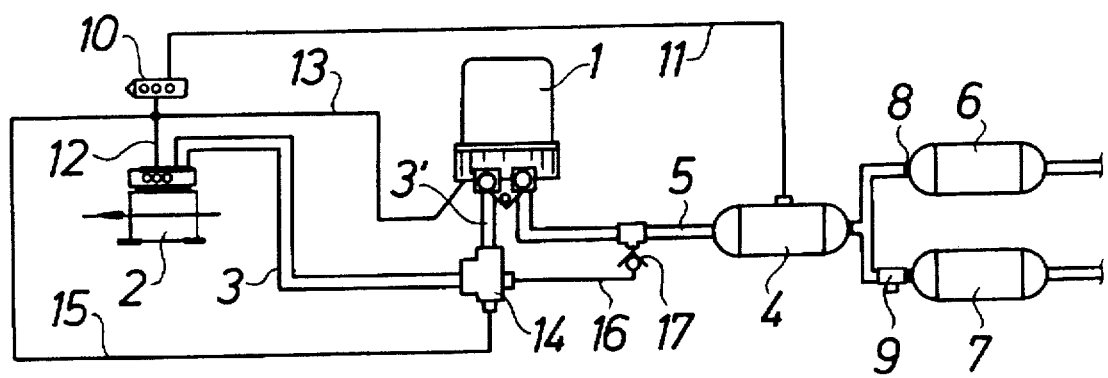

A core element in a compressed air system, primarily for a heavy road vehicle, shown in FIG. 1 is an air drier 1. This air drier 1 is per se known and is accordingly not further described. Compressed air is supplied to this air drier 1 from a compressor 2 through an inlet air conduit 3. Dried and cleaned air is fed from the air drier 1 to a supply tank 4 through an outlet conduit 5 and further from this tank 4 to reservoirs 6 and 7 for use in the vehicle.

The reservoirs 6 and 7 are provided with check valves 8 and 9, respectively, for preventing back-flow, when the pressure in the supply tank 4 becomes lower than in the reservoirs 6 and 7.

A governor 10 receives a pressure signal from the supply tank 4 through a pipe 11. The governor 10 is also connected to the compressor 2 through a pipe 12, the air drier 1 through a pipe 13 and a so called isolation valve 14—to be described—through a pipe 15.

When the system has operated a certain time, so that air delivered from the compressor 2 and dried by passage through the air drier 1 has filled the supply tank 4 and the reservoirs 6 and 7, the pressure in the supply tank 4 will rise to a certain level for influencing the governor 10 to transmit an unloader-signal to the compressor 2, the air drier 1, and the isolation valve 14.

Dried air will now be allowed to flow back from the supply tank 4 through the outlet conduit 5 to the air drier 1 for regenerating the desiccant bed therein.

The compressor 2 used in this system is of a type which requires the system pressure, i e the pressure in the supply tank 4, to be applied against the compressor heads during unloading. The main purpose of the isolation valve 14 is to accomplish this.

As shown in FIG. 1, the isolation valve 14 (arranged in the inlet conduit 3) is not only connected to the governor through the pipe 15 but also to the outlet conduit 5 through a pipe 16, provided with a check-valve 17 for preventing air flow from the isolation valve 14 to the outlet conduit 5 (by-passing the air drier 1).

Figure 2:
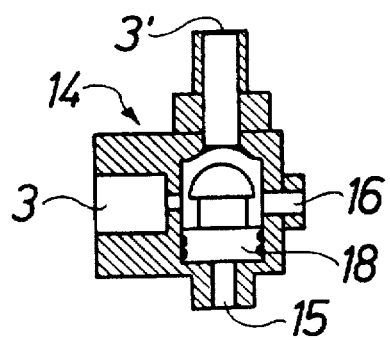

The isolation valve 14 is shown in section in FIG. 2. The valve 14 has an internal shuttle 18, which in FIG. 2 is shown in its normal, operative position allowing incoming air from the conduit 3 to the left in the drawing to flow through the valve and further to the air drier 1 through the conduit part 3' (but also to reach the pipe 16).

The governor signal through the pipe 15 will lift the shuttle 18 against its upper seat, so that the air drier 1 becomes isolated and air from the supply tank 4 is allowed to flow past the check-valve 17 through the pipe 16 and further to the compressor heads.

Figure 5:
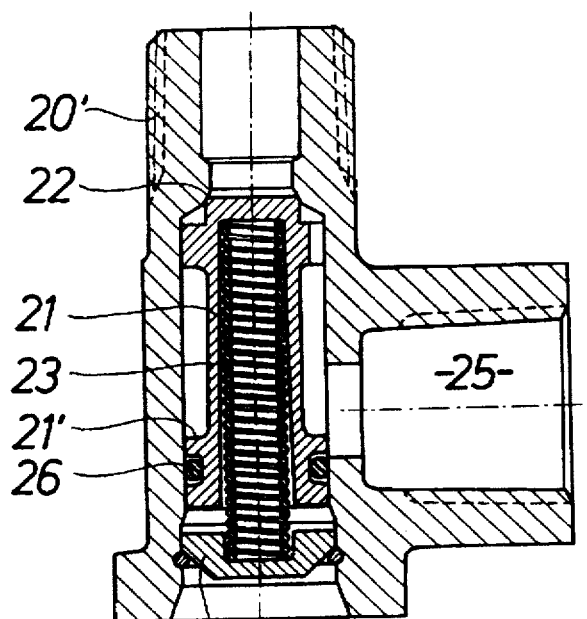

FIG. 5 shows an earlier known, so-called turbo protection valve 20 to be mounted by means of an external thread 20' in an air inlet opening of an air drier in an installation where a certain air pressure is maintained in the inlet conduit to the air drier, even if the compressor is idle. This turbo protection valve 20 has an axially movable valve element 21, which is biased against a seat 22 at the inlet to the air drier by a compression spring 23 supported by a cover 24 attached at the lower end of the valve 20.

At its side the valve 20 is provided with an inlet 25 from the compressor. Air admitted through the inlet 25 acts on a ring-shaped shoulder 21' of the valve element 21, which is provided with a sealing O-ring 26 below this shoulder. Only when the pressure acting on the shoulder 21' exceeds the force from the spring 23 and the possible air pressure above the valve element 21, the valve 20 will open.

Figure 3:
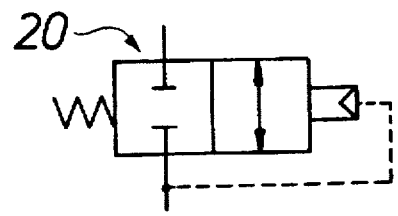
Figure 4:
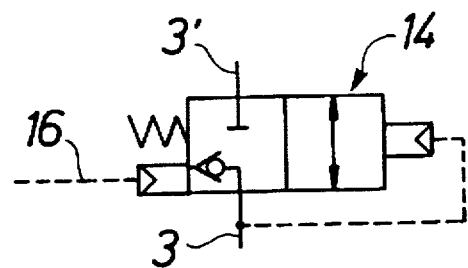

A turbo protection valve 20 is schematically illustrated in FIG. 3, whereas FIG. 4 in a similar manner illustrates an isolation valve 14.

Figure 6:
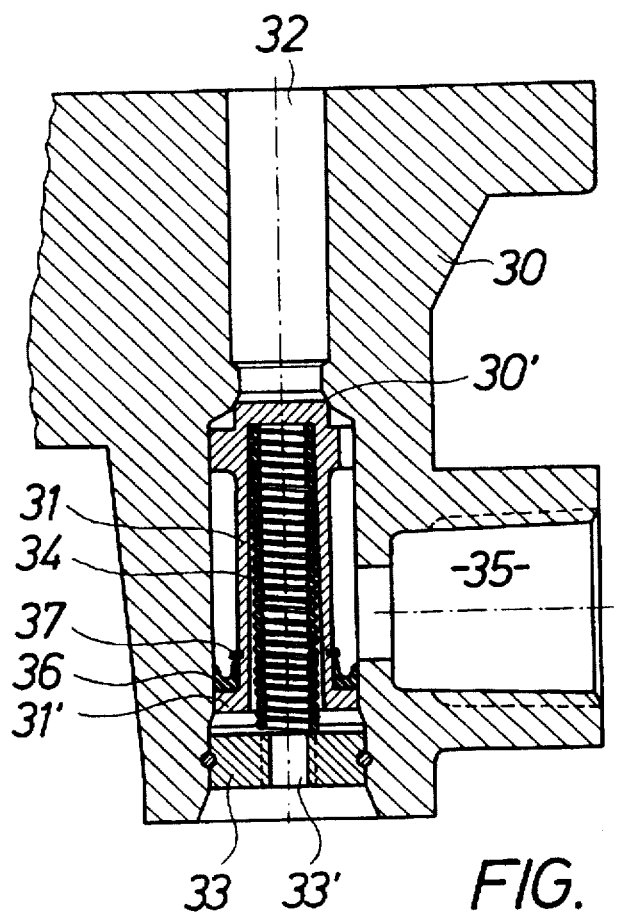

It is often desirable to have an isolation valve of the kind shown in FIG. 2 built into the air drier 1 for obtaining an integrated design. Based on the design of the turbo protection valve 20 of FIG. 5, it is possible to design a built-in isolation valve in accordance with FIG. 6.

Reference numeral 30 denotes an integral bottom part of an air drier of the type shown in FIG. 1. A valve element 31 is axially movably arranged in an enlarged portion of an inlet bore 32. A cover 33 is attached in the lower part of this bore below the valve element 31, and a compression spring 34 is arranged between the valve element 31 and the cover 33 for biasing the valve element 31 against a seat 30'. The cover 33 is provided with a threaded hole 33' for connection of the pipe 15 from the governor 10.

In front of the valve element 21 the air drier bottom part 30 is provided with an inlet 35 for connection to the inlet conduit 3. Under the level for the inlet 35, the valve element 31 has a ring-shaped shoulder 31', on which a U-sealing 36 is arranged. The U-sealing 36 is held in proper position on the shoulder 31' by means of a locking ring 37.

In normal operation air is admitted through the inlet 35 from the compressor 2. The valve element 31 is depressed against the bias of the spring 34 by the pressure acting on the shoulder 31', so that air can flow past the valve seat 30' into the inlet bore 32. If the pressure in the inlet 35 decreases, the valve will function exactly as the turbo protection valve 20, described above under reference to FIG. 6.

When an unloader signal is received from the governor 10 (FIG. 1) through the hole 33' in the cover 33, the air pressure will act on the underside of the valve element 31 and assist the spring 34 in keeping the valve element 31 sealingly against the seat 30', so that the air drier is isolated from the inlet conduit 3 connected to the compressor 2. Also, air under the unloader signal pressure can pass the outer circumference of the shoulder 31', which has a smaller diameter than the bore in which it is axially movable. Due to the shape of the U-sealing 36 air can pass the sealing in this direction and reach the inlet 35 for transfer to the compressor 2.

In normal operation, when no unloader signal is present in the hole 33' and air passes the valve from the inlet 35 to the inlet bore 32, the U-sealing 36 will effectively seal against its bore.

The U-sealing 36 will accordingly act as a check-valve corresponding to the check-valve 17 in the arrangement according to FIG. 1.

If the isolation valve function is not needed, the hole 33' is closed with the exception of a small venting passage for the compartment under the valve element 31. The valve will hereby function as the turbo protection valve 20 of FIG. 5.

We claim:

1. An inlet valve for an air drier (1) between an inlet (35) from a compressor (2) and an inlet bore (32), comprising an axially movable valve element (31), a spring (34) for biasing the valve element into a closing position against a seat (30'), and a valve element shoulder (31'), on which the pressure in the inlet is arranged to act in a valve opening direction, characterized in that a sealing on the shoulder (31') is in the form of a U-seal ling (36) allowing air under pressure admitted to the underside of the valve element (31) for urging the latter in a valve closing direction to pass by the sealing to the inlet (35) but preventing flow in the opposite direction.

2. A valve according to claim 1, provided with a cover (33) under the valve element (31) supporting the spring (34), characterized in that the cover (33) is provided with a hole (33') for connection to a source for air under pressure.

* * * * *